(12) United States Patent
Steinberg

(10) Patent No.: US 6,503,346 B1
(45) Date of Patent: Jan. 7, 2003

(54) FUEL ROD CLADDING TUBE FOR A BOILING WATER REACTOR FUEL ROD AND THE PRODUCTION THEREOF

(75) Inventor: Eckard Steinberg, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/381,185

(22) PCT Filed: Feb. 26, 1998

(86) PCT No.: PCT/EP98/01105
§ 371 (c)(1),
(2), (4) Date: Jan. 10, 2000

(87) PCT Pub. No.: WO98/40893
PCT Pub. Date: Sep. 17, 1998

(30) Foreign Application Priority Data

Mar. 11, 1997 (DE) .......................................... 197 09 929

(51) Int. Cl.$^7$ ............................................... C22C 16/00
(52) U.S. Cl. ....................... 148/421; 148/672; 148/714; 376/457
(58) Field of Search ................................ 148/672, 421, 148/714; 376/457

(56) References Cited

U.S. PATENT DOCUMENTS

| 4,169,743 A | 10/1979 | Lee |
| 4,718,949 A | 1/1988 | Takase et al. |
| 4,938,921 A | 7/1990 | Mardon et al. |
| 4,990,305 A | 2/1991 | Foster et al. |
| 5,361,282 A | 11/1994 | Adamson et al. |
| 5,681,404 A * | 10/1997 | Adamson et al. ........... 148/421 |

FOREIGN PATENT DOCUMENTS

| DE | 29 51 102 A1 | 6/1980 |
| DE | 32 24 685 A1 | 1/1983 |
| DE | 33 12 803 C2 | 4/1988 |
| EP | 0 085 553 A2 | 8/1983 |
| EP | 0 425 465 A1 | 5/1991 |
| EP | 0 498 259 A2 | 8/1992 |
| EP | 0 624 882 B1 | 4/1993 |
| FR | 1327734 | 4/1963 |
| GB | 1 529 664 | 10/1978 |

OTHER PUBLICATIONS

German Utility Model G 92 06 038.2, dated Aug. 27, 1992, material and structural part made of modified zircalloy.

International Patent Application WO 92/08818 (Busch), dated May 29, 1992.

John J. Schemel et al.: "Influence of the Manufacturing Process on the Corrosion Resistance of Ziraloy–4 Cladding", ASTM STP 1023, pp. 141–152, Dec. 1989.

(List continued on next page.)

Primary Examiner—John Sheehan
Assistant Examiner—Andrew L. Oltmans
(74) Attorney, Agent, or Firm—Laurence A. Greenberg; Werner H. Stemer; Ralph E. Locher

(57) ABSTRACT

Cladding tube for a fuel rod for a boiling water reactor fuel element, and its production. The cladding tube is composed practically homogeneously of the constituents of zircaloy and, with the ductility parameter $\gamma = \sqrt[3]{(kd)}/(fr)^2 \leq 3.5$ ($\gamma$=ductility parameter, KD=mean grain diameter; fr=Kearns factor), has an elongation at break of at least 20%, set by low-temperature treatment of an extruded tube blank. The starting body used for the extrusion has a defined distribution of precipitated secondary particles which is produced by β-quenching and differs in the areas which form the inner surface and outer surface of the extruded tube. At the inner surface, the particles have a greater diameter and are at a greater average distance apart, this distribution being described by the "spacing".

19 Claims, 10 Drawing Sheets

OTHER PUBLICATIONS

Keizo Ogata et al.: "A Systematic Survey of the Factors Affecting Zircaloy Nodular Corrosion", ASTM STP 1013, pp. 291–314, Dec. 1989.

F. Garzarolli et al.: "Behavior and Properties of Zircaloys in Power Reactors: A Short Review of Pertinent Aspects in LWR Fuel", ASTM STP 1295 (1996), pp. 12–32, (No month data).

F. Garzarolli et al.: "Behaviour Of Structural Materials For Fuel And Control Elements In Light Water Cooled Power Reactors", IAEA–SM–288/24 (1987), pp. 387–407, (No month data).

F. Garzarolli et al.: "Microstructure and Corrosion Studies for Optimized PWR and BWR Zircaloy Cladding", ASTM STP 1023 (1989), pp. 202–212, (No month data).

S. L. Wadekar et al.: "Structure–Property Correlation Of Zr–Base Alloys", Journal of Nuclear Materials, vol. 151 (1988), pp. 162–171, (No month data).

W.J.S. Yang et al.: "Precipitates in Zircalloy: Identification And The Effects Of Irradiation And Thermal Treatment", Journal of Nuclear Materials, vol. 138 (1986), pp. 185–195 (No month data).

* cited by examiner

FUEL ROD CLADDING TUBE FOR A BOILING WATER REACTOR FUEL ROD AND THE PRODUCTION THEREOF

BACKGROUND OF THE INVENTION

Field of the Invention

The invention relates to a cladding tube for a fuel rod which is or can be used in a fuel element of a boiling water reactor, the cladding tube, between its inner side (the side facing toward the nuclear fuel enclosed in the cladding tube) (inner surface) and its outer side (outer surface), comprising a zirconium alloy with a practically constant chemical composition, but at these two surfaces having a different microstructure.

Such a fuel rod is illustrated in FIG. 1, in which the two ends of the cladding tube 1 are closed by means of metal stoppers 2 and enclose a column of fuel pellets 3. At least at one end (usually the top end), a spring 4 provides a gas collection chamber, while in the state immediately after it has been produced, there is a gap 5 between the pellets 3 and the cladding tube 1, which gap closes gradually, however, when the cladding tube is compressed by the pressure of the boiling water while the reactor is operating and the pellets swell. To ensure good heat transfer from the pellets to the cladding tube and the cooling water, the tube generally has a helium atmosphere of a few bar.

FIG. 1 also shows the pellets in the state 3a immediately after they have been produced and in the state 3b when the reactor has started to operate and the pellets have burst due to the high thermal loads.

In view of the fundamental requirement that in light water cooled nuclear reactors the cladding tubes for the fuel rods should exhibit low neutron absorption, the cladding tubes are made from a material which predominantly comprises zirconium of a purity which is standardized for tubes used in nuclear applications (e.g. R60001). However, in addition to the neutron absorption, a multiplicity of chemical, mechanical and other physical conditions which impose demands on the material and its production have to be observed, and some of these requirements are not compatible and, moreover, vary for different types of reactor (boiling water reactor or pressurized water reactor). When used for long periods in water or steam, pure zirconium is not sufficiently corrosion-resistant and must therefore be weakly alloyed with additions which have to be adapted according to the type of reactor.

Thus, the nuclear reaction causes iodine and other gaseous fission products to be formed in the nuclear fuel, leading, on the one hand, to an increase in volume of the fuel and, on the other hand, to an aggressive atmosphere on the inner side of the cladding tube. The pellet fragments 3b (FIG. 1) may lead to punctiform pressure and substantial local stresses on the inner surface of the cladding tube and, at the same time, the aggressive fission products are directed onto the inner surface through the fractured surfaces. In zircaloy, which is the standard material for cladding tubes, this combination of local stresses and an aggressive atmosphere results in stress cracks beginning to form from the contact points, along which stress cracks intensified corrosion propagates, initiated primarily by the iodine. These stress corrosion cracks grow through the entire wall thickness of the cladding tube and lead to perforation of the cladding tube (so-called "pellet cladding interaction", PCI).

Pure zirconium (e.g. "sponge zirconium", which is the standard commercially available form of reactor-purity zirconium) is less susceptible to PCI, since pure zirconium has a higher ductility than zircaloy, so that the local stresses are partially absorbed by plastic deformation of the zirconium and are therefore unlikely to reach the threshold which is critical for PCI. However, pure zirconium is too soft in terms of the high mechanical stability required of such cladding tubes (diameter: approx. 1 cm, length approx. 4 m, wall thickness approx. 1 mm!). For this reason, so-called "liner cladding tubes", in which a tube made from zircaloy has a thin lining of pure zirconium on the inner side, are frequently used. Since the introduction of such liners, punctiform damage caused by PCI is scarcely ever observed on the corresponding cladding tubes.

Zircaloy is a standardized alloy (e.g. US standard R60802) which has as far as possible been optimized in terms of stability by the addition of tin and in terms of corrosion by the addition of iron, chromium and, if appropriate, nickel.

However, PCI damage has been observed practically only in boiling water fuel elements, but not in pressurized water fuel elements, even though the high pressures in the pressurized water reactor press the cladding tube onto the fuel over the course of time (the so-called "creep" phenomenon). However, the particular way in which boiling water reactors are controlled results in particularly high loads. The most common cause of damage in pressurized water fuel rods is chemical corrosion from the water which attacks the outer surface and/or mechanical corrosion caused by friction in the fuel element (so-called "fretting"). In this case, aqueous corrosion acts practically uniformly on the entire surface of the cladding tube, which is therefore attacked uniformly (uniform corrosion), this corrosion behavior being considerably intensified by the high operating temperature and the chemical composition of the pressurized water in the pressurized water reactor.

Due to the lower operating temperature and the water in the boiling water reactor containing more oxygen, in practice the corrosion observed on the outer surface of the cladding tubes in such reactors is not uniform, but rather is characterized by punctiform, locally delimited oxide blisters (so-called "nodular corrosion"), which are not observed in the pressurized water reactor. While individual blisters are often tolerable, a denser covering with these blisters may lead to deposition (so-called "crud") of contaminants and dissolved metals (e.g. copper) from the boiling water, an effect which reduces the cooling of the fuel rods and, in extreme cases, uniform corrosion may also be considerably accelerated as a result of overheating of the fuel rod.

Nowadays, the cause of the nodular corrosion is considered to be the fact that the alloying elements iron, chromium and nickel are deposited as secondary phases in zirconium alloys, i.e. as particles ("secondary phase particles", SPPS) which are distributed throughout the entire grain structure of the material and the number, size and spacing of which are determined by the manufacturing process. If these SPPs have become too large owing to high manufacturing temperatures, they initiate nodular corrosion under the aqueous-chemical conditions of the boiling water reactor. For this reason, cladding tubes for boiling water reactors are manufactured in a "low-temperature process" (LTP).

However, advances in reactor engineering have led to the fuel containing ever more fissile material, i.e. having a higher energy content, thus allowing a longer service life (so-called "burn-up") of the fuel rods and also leading to somewhat higher fuel-rod and operating temperatures. It is therefore necessary even in boiling water reactors to take into account uniform corrosion of the cladding tubes, which according to current knowledge is promoted if the size of the SPPs is too small. Therefore, there is a need for manufacturing processes which allow optimization between nodular and uniform corrosion.

Further damage to cladding tubes is formed by cracks which have a considerable extent in the axial direction. Although these extensive cracks are significantly less common than the PCI defects mentioned above, they also lead to significantly greater disruptions to operation, since significant quantities of the fuel rod contents can be washed out through these cracks. Since these cracks occur considerably more often in liner cladding tubes than in liner tubes which consist entirely of zircaloy (so-called "solid-wall tubes"), there are increasing objections to the use of the pure zirconium liner. Moreover, in the case of the liner tubes, it is necessary to ensure, by means of meticulous quality testing, that the liner adheres firmly to the supporting tube, so that there can be no disruption to the dissipation of heat resulting in corresponding local overheating of the fuel rod.

SUMMARY OF THE INVENTION

The invention is therefore based on the object of providing and producing a single-component cladding tube which, on the inner surface, has a high resistance to PCI and to the extended cracks mentioned above, which are attributable to embrittlement, and, at the same time, on the outer surface is as resistant as possible both to uniform corrosion and to the nodular corrosion which arises in the cooling water of the boiling water reactor.

The invention works on the basis that the stress-corrosion cracking (induced primarily by iodine), which is largely independent of the precipitated secondary phases, can be practically prevented by a microstructure of the matrix in which an optimum grain size is combined with an optimum texture. This microstructure is therefore to be approximately of the same ductility as the iodine-resistant, ductile zirconium liner and, at the same time, is also to be resistant to the extended cracks which are formed in the liner; i.e. it should not be damaged extensively either by corrosion or by embrittlement.

However, the inner surface should also have a better resistance to uniform corrosion than that of pure zirconium, because small amounts of water may penetrate through slight defects which in themselves are tolerable (e.g. undiscovered, small leaks in the weld seams or those brought about by the "fretting" phenomenon mentioned above) into the interior of the cladding tube, where this water reacts with the wall material and the fuel so as to evolve oxygen; the oxidation reaction would be insignificant, but the resultant hydrogen would not be, since it would make the wall material brittle. The interaction of oxidation and embrittlement resulting from the uptake of hydrogen may then lead to the cracks mentioned above.

Therefore, according to EP-A-0,726,966 the pure zirconium of the liner is alloyed with about 0.5% by weight of iron, which is practically insoluble in zirconium. The iron is precipitated in the form of particles which increase the resistance to uniform corrosion but only bring about a slight dispersion hardening, i.e. scarcely change the ductility of the pure zirconium.

However, a composite tube of this nature is expensive to produce, since it is necessary to avoid the risk of manufacturing errors. Therefore, there is a desire for solutions which allow a material of uniform chemical composition to be used while satisfying the different requirements imposed on the two surfaces by means of differences in the microstructure, i.e. in the grain structure of the alloy matrix and/or the form and distribution of secondary phases in which insoluble alloying fractions are precipitated.

For example, it is proposed in DE-A-29 51 102 for the outer surface of a zircaloy cladding tube to undergo secondary heating with laser beams in the β-area and to be cooled rapidly, in order in that area to establish a quenched β-structure of the matrix with particularly small grains. According to GB-B-1,529,664, a similar effect is achieved by the finished tube being heated again from the outside, while the inner surface is kept at a lower temperature by means of a flow of water ("temperature gradient annealing").

According to EP-A-0,660,883, the outer surface is heated into the b-range and is then cooled, but the inner surface is held at a moderately elevated temperature ("partial β-quenching"), water being atomized onto the inner surface by means of hot inert gas, in order to limit the temperature gradient during β-quenching. Then, the quenched β-structure is present in a relatively wide layer on the outer surface, while the α-structure is present in a thin inner layer which in practice constitutes a liner.

According to U.S. Pat. No. 4,718,949, the partial β-quenching can also be combined with temperature gradient annealing. In that document, it is proposed for the outer surface of a tube—before or after pilgering steps which are used to produce the final dimensions of the tube—to be heated to the β-range, while the inner surface is being cooled. As a result, to protect against nodular corrosion, the alloying constituents at the outer surface are to be held predominantly in the matrix and there is to be less precipitation than on the inner side. Then, the outer surface is cooled and the inner is annealed at the recrystallization temperature in the α-range. However, these measures require long processing times and a high outlay on equipment in order to keep the entire length of the finished cladding tube in the temperature range required for a sufficiently long time, and are therefore not employed.

However, the invention works on the basis that at least the areas on the inner wall, and preferably practically all the areas of the tube wall, should have a high ductility, in order to reduce not only the formation, but also the propagation, of stress cracks. This ductility can be achieved by a matrix of particularly small grains, although larger grains are also possible given a specific structure of the grains, which can be described by a relatively high Kearns factor. This leads to the introduction of a ductility parameter $\gamma = ^3\sqrt{(KD)}/(fr)^2$, where (KD) is the mean grain diameter, measured in $\mu$m, and (fr) is the Kearns factor. By means of a thermal/mechanical processing which has a virtually uniform action on all parts of the tube (i.e. eliminates temperature gradient annealing), the two variables can be set in such a way that $\gamma < 3.5$. This corresponds to an elongation at break for the material which is over about 20% at 300° C.

The chemical composition of the material is selected with a view to corrosion; the composition of zircaloy-2 or zircaloy-4 is particularly suitable; alternatively, a composition containing the same alloying constituents but in concentrations which are optimized so that they deviate slightly from the standards for zircaloy may also be suitable. As has already been mentioned, the same chemical composition may lead to high nodular corrosion and low uniform corrosion or to the opposite scenario if the size and amount of precipitation of undissolved alloying constituents ("secondary phases") are changed by the heat treatment during manufacture.

The invention therefore provides for the cladding tube to be manufactured with a practically homogenous chemical composition, but for the distribution (size and amount) of secondary phases to be matched to the requirements imposed on the inner surface and the outer surface by manufacturing these surfaces from a material which undergoes different preliminary heat treatments prior to the above-mentioned thermal/mechanical treatment which acts evenly on all areas of the cladding tube and is used to attain the final dimensions of the tube.

This is because the invention provides for the inner surface to have a certain minimum covering of particles of a certain minimum size in order to protect against uniform corrosion and the cracks mentioned above. In this context, however, it is inevitable that particles of this minimum size will also be formed at the outer surface. The inevitable presence of large particles on the outer surface is, however, contrary to the requirement in that area that, with regard to nodular corrosion, the size and number of particles on the outer surface are to be limited.

However, the invention provides a manufacturing process which makes it possible to produce a cladding tube which fulfills these contradictory requirements.

The object set is therefore solved by means of a process and a cladding tube. Advantageous refinements of the invention are described in the subclaims.

BRIEF DESCRIPTION OF THE DRAWINGS

In order to provide a better understanding of the invention and its refinements, an exemplary embodiment is described in more detail with reference to 15 figures, in which.

Figure 1:
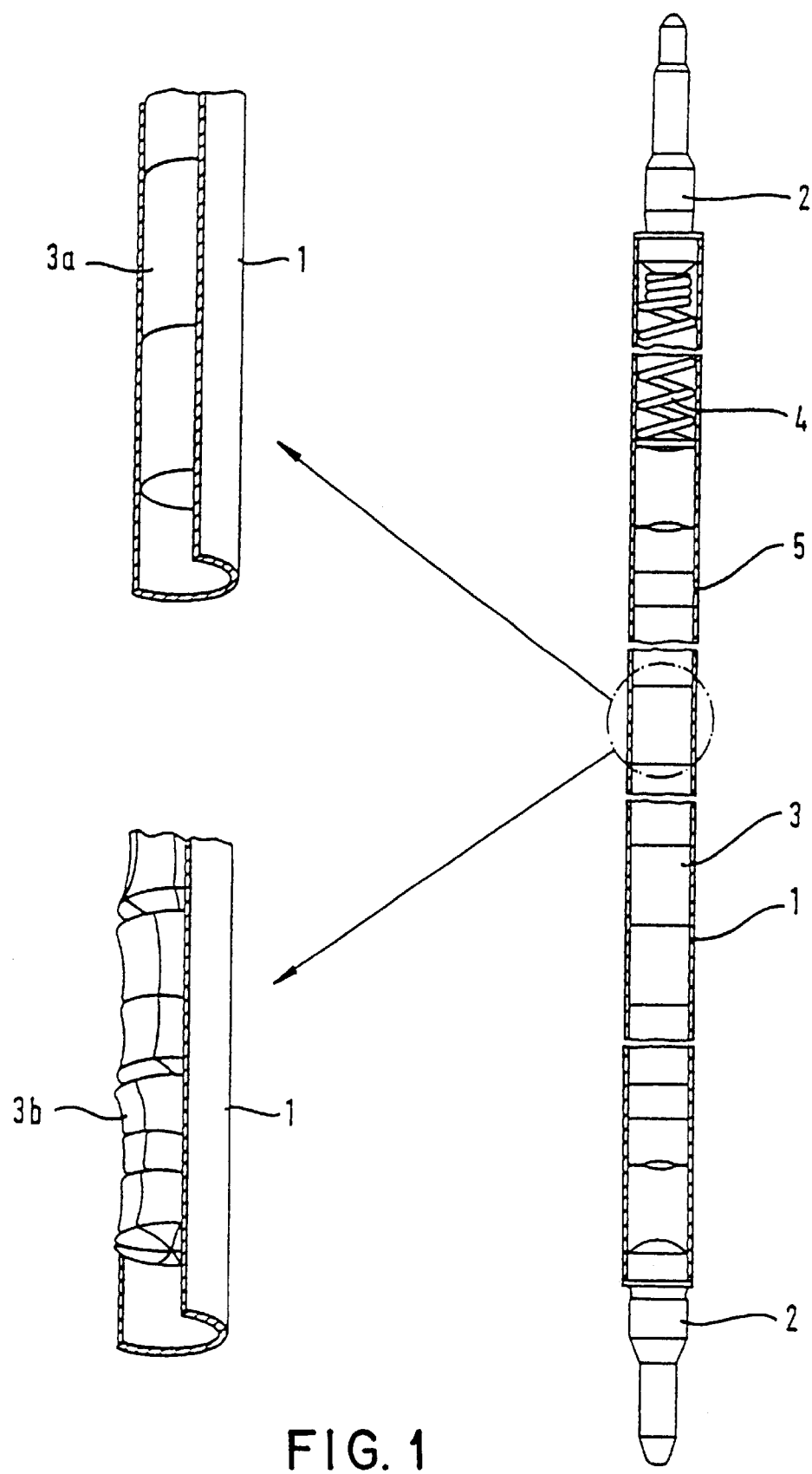
FIG. 1 shows a longitudinal section through a fuel rod of a boiling water reactor.

According to the invention, the cladding tube can be produced from a starting body which comprises alloying constituents of zircaloy; the fraction of these constituents which dissolves in the zirconium matrix of the alloy at temperatures of above about 860° C. and is precipitated as an intermetallic compound ("particles" or "secondary particles") at lower temperatures, is of particular significance.

DESCRIPTION OF THE PREFERRED EMBODIMENTS

The starting body is initially heated to above this dissolution temperature, which corresponds to the boundary between the ($\beta+\beta$) phase, and is then cooled, the cooling-down rate being lower in the interior or in a first area of the starting body than in the vicinity of the surface (second area), in which a distribution with smaller and more numerous particles than in the first area is therefore established.

It is essential that this different distribution should not be destroyed again by the following further processing, but rather should be largely maintained. The starting body is therefore extruded but is then no longer heated to temperatures of over 860° C., but rather only to temperatures of below 810° C., in order to establish particle growth without the particles growing to an impermissible size or without a dissolution/precipitation process taking place again. Rather, the extrusion produces a tube blank whose inner surface is formed by material of the first area, while the material of the outer surface comes from the second area.

By means of a mechanical/thermal treatment (e.g. a pilgering process with annealing treatments after the individual pilgering steps), the blank is brought to the final dimensions of the cladding tube. In the process, a grain structure is established which leads to a ductility with a relative elongation at break of at least 20% (measured at 300° C.). The differences in the particle distribution in the various areas of the starting body result in the logarithmic mean of the particle size at the inner surface of the cladding tube being greater than at the outer surface.

The surfaces of the corresponding cladding tube therefore consist of material which comes from areas of a uniformly produced starting body which have been subjected to different heat treatments, and these surfaces have different particle distributions and sizes, leading to different corrosion behaviors, and can be adapted to the corresponding conditions in the boiling water fuel rod (nodular corrosion on the outer surface; uniform corrosion in the event of water gaining access to the inner surface). In addition, with a view to stress-corrosion cracking, a ductility of at least 20% is established and is available even in an iodine-containing atmosphere.

The operating licenses of existing reactors usually work on the basis of the standardized alloys zircaloy-2 (1.2 to 1.7% by weight Sn; 0.07 to 0.20% by weight Fe; 0.05 to 0.15% by weight Cr and 0.05 to 0.08% by weight Ni) or zircaloy-4 (1.2 to 1.7% by weight Sn; 0.18 to 0.24% by weight Fe; and 0.07 to 0.13% by weight Cr); there is therefore no need to change the license if the invention also complies with these limits.

However, the presence of chromium has proven to be not absolutely necessary in all cases, while iron contents of up to 0.35% or even 0.4% may be advantageous. In this case, lower limits of 0.05% or at least 0.10% Fe may be considered advantageous. Nickel may promote undesired hydrogenization of the material.

Silicon, like oxygen, is an accompanying element in reactor-purity zirconium which is a permitted contaminant in the standards, but is often desirable in controlled amounts during production, since the fact that it forms nonmetallic precipitation allows it to be used to good effect to set the grain size. Furthermore, up to 0.2% oxygen may be advantageous, since oxygen improves the mechanical strength without substantially reducing the ductility.

For corrosion, a minimum tin content of 0.5% was originally considered necessary with a view to neutralization of nonmetallic and/or disruptive accompanying elements, such as nitrogen or phosphorus, but also for mechanical properties a minimum tin content of 0.8% is advantageous. In this case, it is also possible to use tin contents which lie above the levels given in the standard, provided that the corrosion-promoting influence of larger quantities is compensated for in some other way. However, in combination with a high oxygen content (e.g. more than 0.35% of oxygen +iron), the result could be an excessive hardness of the alloy.

In particular, the invention provides an alloy comprising from 1.0 to 2.0% by weight tin, from 0.10 to 0.35% by weight iron, from 0.10 to 0.20% by weight chromium, max. 0.10% by weight nickel, from 50 to 200 ppm of silicon, remainder zirconium with 0.05 to 0.20% oxygen and other inevitable accompanying elements and contaminants. Advantageously, the alloy contains, in addition to Zr, Sn, Fe, Cr, Ni, Si and O, only up to 0.20% by weight of impurities.

Figure 2:
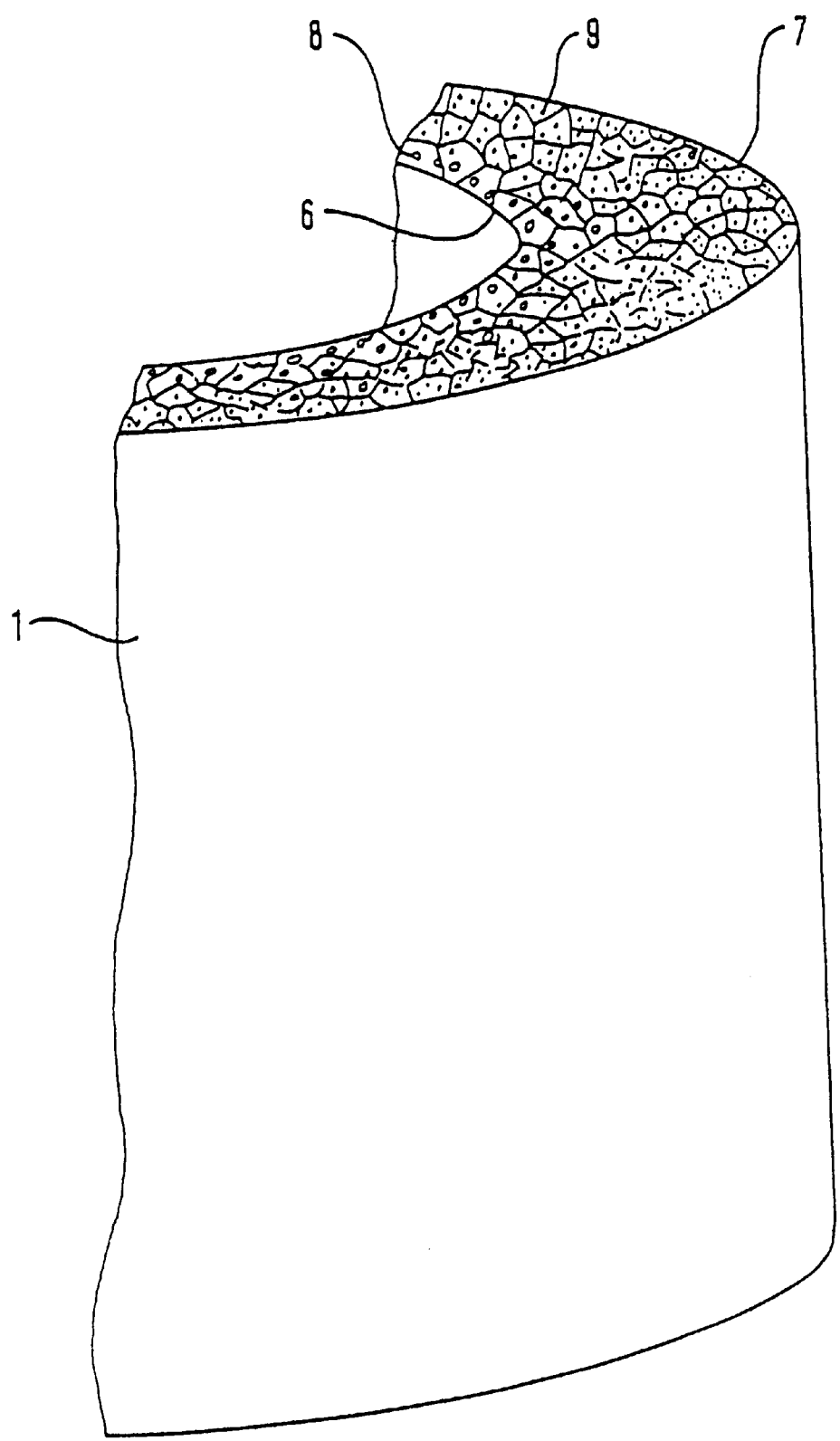
FIG. 2 shows part of the wall of a cladding tube according to the invention.

The composition of the cladding tube is practically constant between the inner surface 6 and the outer surface 7 (FIG. 2).

However, the size and number of the particles of the secondary phases which are deposited in the vicinity of these surfaces differ; these secondary phases comprise predominantly iron, chromium and/or nickel and their intermetallic compounds with zirconium and tin, since Fe, Cr and Ni are only very slightly soluble in zirconium. Other contaminants, such as those which are inevitable in, for example, zirconium and are also found in zircaloy, may possibly also form precipitated secondary phases in some instances, but there has been no evidence of such secondary-phase particles having an effect, and this phenomenon is therefore regarded as tolerable. Nevertheless, with a view to unforeseen influences, secondary phases of such accompanying elements should as far as possible be avoided or at least be subjected to the same conditions, in terms of size and distribution, as the precipitation of the alloying constituents mentioned above.

In a material, the distribution of such particles, the above-mentioned SPPs, can be set by initially heating the material to temperatures at which the alloying constituents dissolve. For the constituents mentioned above, these are temperatures of above about 830° to 860°, i.e. the zirconium alloy is heated into the upper α or the α+β-range. This is then followed by a controlled heat treatment in which in particular the times for which the material is held at temperatures just below the dissolution temperature result in relatively large particles growing at the expense of the number of small particles precipitated, while lower temperatures have an ever-decreasing effect on the grain size growth. The inner areas of the cladding tube 2 containing the particles 8 therefore come from an area in the starting body which was held at higher temperatures for a longer period (e.g. was cooled more slowly) than the area from which the particles 9 in the outer areas of the cladding tube come.

The effect of this different thermal history is that alloying constituents which are not soluble in the cooled matrix of the cladding tube cover less of the inner surface 6 (number of particles per unit area) than of the outer surface 7, i.e. there is a greater average distance between the precipitated particles 8 in the vicinity of the inner surface 6 than between the corresponding particles 9 which are distributed in the vicinity of the outer surface 7.

Furthermore, FIG. 2 roughly illustrates that the size and texture of the grains 8' and 9' in which the zirconium alloy of the cladding tube is formed are an important factor. This size and texture is virtually identical in all areas of the finished cladding tube.

Figure 3:
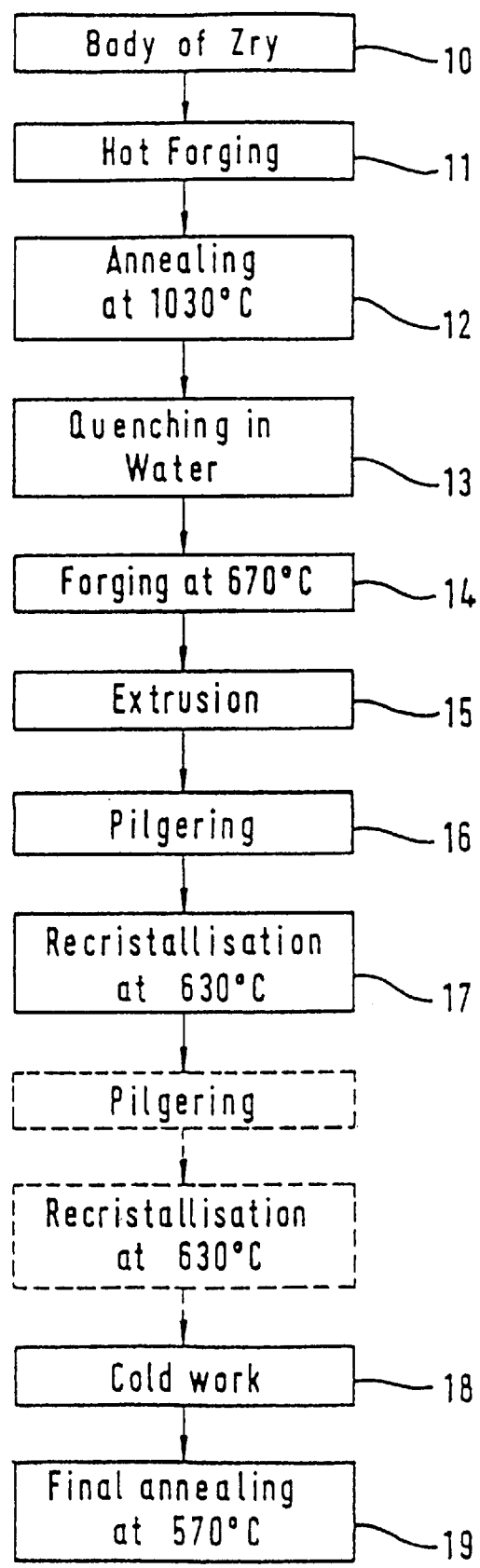
FIG. 3 shows a flow diagram for an exemplary embodiment of the process according to the invention.

To produce the cladding tube 2, according to position 10 in the diagram shown in FIG. 3, firstly a melting block made from a zirconium alloy—in the exemplary embodiment described here containing 1.5% Sn, 0.28% Fe, 0.18% Cr, 0.005% Ni, 0.09% O, 0.01% Si, remainder zirconium of standard purity—is provided as the starting body for manufacture. Compared to the standard composition of zircaloy, in this alloy the iron and chromium contents are selected to be relatively high, and this has a beneficial effect both on the corrosion resistance and on the hydrogen uptake. This concentration also helps the particles which are precipitated to form in the desired pattern subsequently.

According to position 11, the melting block is then forged to a diameter of 340 mm at temperatures which initially lie in the Grange and then in the α-range. Next (position 12), this slab is heated to 1030° C., i.e. to β-temperature.

As the first measure which is of decisive importance for the desired microstructure in the cladding tube, this slab is then quenched in a water bath (position 13). The aim is to maintain a relatively high cooling-down rate at the outer surface when passing through the α+β-range. In the vicinity of the outer surface (for practical measurements, a depth of 5 mm below the outer surface has to be used), this cooling-down rate is at least 30 K/s. However, the center of the slab cools significantly more slowly; the cooling-down rate in the center of the slab should not exceed 0.5 K/s. The result is considerable differences in the size of the particles which hold the iron, chromium and nickel which is no longer dissolved in the material. These particles initially have a mean diameter of about 15 to 20 mm and grow in proportion to the temperature and time given by the quenching, the relationship being non-linear. In the center of this slab, which is at a higher temperature for longer than its outer zone, relatively large particles are formed.

After this operation, the starting body is then forged again at a defined temperature (position 14). In this example, the temperature is 670° C. and the total processing time (including the residence time in a furnace) is 4.5 hours. This heat treatment in the α-range is selected in such a way that there is a particle growth parameter (PGP) of between 0.6 and 1.0, the particle growth parameter—taking into account the heating and cooling-down operations ("cooling-down rate", CDR, measured in K/s), which can be estimated at 0.5/CDR, if necessary—being given by $$PGP=10^{14} \cdot \Sigma\{t \cdot \exp(-Q/nRT)\}+0.5/CDR$$

In this equation, n is a constant $(0.47 \cdot 10^{-7})$ which is typical for the growth of particles of this composition, and Q/R is also a constant (18.240 K), so that to determine the PGP, only the time (measured in hours) and temperature (measured in K) used during this heat treatment (position 14) has to be inserted into the following equation $$PGP=10^{14} \cdot \Sigma\{t \cdot \exp(-32000/T)\}+0.5/CDR.$$

This step can be carried out in such a way that the CDR is of no importance. The diameter of the billet is now 230 mm. Next, a pipe blank is produced by extrusion (position 15), in that the billet is initially cut into pieces about 400 mm long, and a hole is drilled in the center of the pieces which are then extruded at 650° C. The time required for this manufacturing step is so short that there is no significant particle growth; i.e. this operation can be disregarded when calculating the PGP.

Next, in a plurality of steps 16 and 17, the diameter D is reduced by certain amounts dD each time, this diameter reduction being brought about by cold pilgering with intermediate recrystallization annealing steps at about 630° C. The individual pilgering steps are carried out with high levels of deformation, the Q value never falling below 1.0. The recrystallization annealing treatments for all these pilgering steps amount to total annealing times of 4 hours.

The final forming step (position 18) is cold working by 82%, which is carried out with a Q value of 6.5 and is concluded by final annealing (position 19) of 6 hours at 560° C.

In general terms, the Q value mentioned is a geometric parameter for describing the deformation and is calculated from the wall thickness $S_o$ of the tube prior to pilgering, the wall thickness s after pilgering, the external diameter $D_o$ before pilgering and the external diameter D after pilgering, using the following formula $$Q = \frac{\ln\left(\frac{s_0}{s}\right)}{\ln\left(\frac{D_0 - s_0}{D - s}\right)}$$

A further geometric factor is KV, which indicates the cold working in percent, or the factor y for the logarithmic extension;

$$KV = 100 \cdot \left[1 - \frac{s \cdot (D-s)}{s_0 \cdot (D_0 - s_0)}\right];$$

$$\psi = \ln\left[\frac{s_0 \cdot (D_0 - s_0)}{s \cdot (D-s)}\right] = \ln\left[\frac{1}{1 - \frac{Kv}{100}}\right]$$

The grain diameter which results after the final forming step is established essentially by the extent of cold working. The following relationships between the grain diameter KD' before pilgering and the grain diameter KD in the pilgered material apply to the pilgering steps for the overall working of the pipe blank produced by extrusion (positions 16 to 19):

$$KD = \frac{KD'}{1 + \exp(k_1 \cdot \psi - k_2)}.$$

Furthermore, the Kearns factor (fr) is used to describe the crystal orientation, i.e. the position of the crystals (in this case: of the hexagonal crystals) within the grains. This position can in practice be set by the Q factor of the final processing step, although the orientation in the preceding state of the tube also retains an influence. The Kearns factor is as follows:

$$(fr) = (fr)' + k_3 \cdot Q.$$

In the above equations, the constants are as follows: $k_1 = 2.56$; $k_2 = 3.66$ and $k_3 = 0.0182$. The Q value, which can be set by means of the way in which the process is carried out, therefore provides the possibility of influencing the Kearns factor for the texture. In the example, tests prior to pilgering measured a mean grain diameter KD'=8.7 4 μm and a Kearns factor (fr)'=0.55. This results in the following values for the grain diameter KD of the finished cladding tube: 3.07 μm (measured) and 2.83 μm (calculated), and in the following values for the Kearns factor (fr): 0.67 (measured) or 0.67 (calculated). This results, in the finished cladding tube of the exemplary embodiment, for the ductility parameter defined in this invention $$\gamma = \sqrt[3]{KD}/(fr)^2$$

in the values γ=3.24 (measured) or x=3.15 (calculated), i.e.:

$$\gamma \leq 3.5.$$

In practice, this relationship applies over the entire volume of the cladding tube, since the size of the grain and the texture of the grain are in practice determined only by measures which have been carried out after extrusion on the overall tube blank and act evenly on all areas of this tube blank. They therefore lead to the same texture and grain size being present on the inner surface as in the other areas of the cladding tube.

Figure 4:
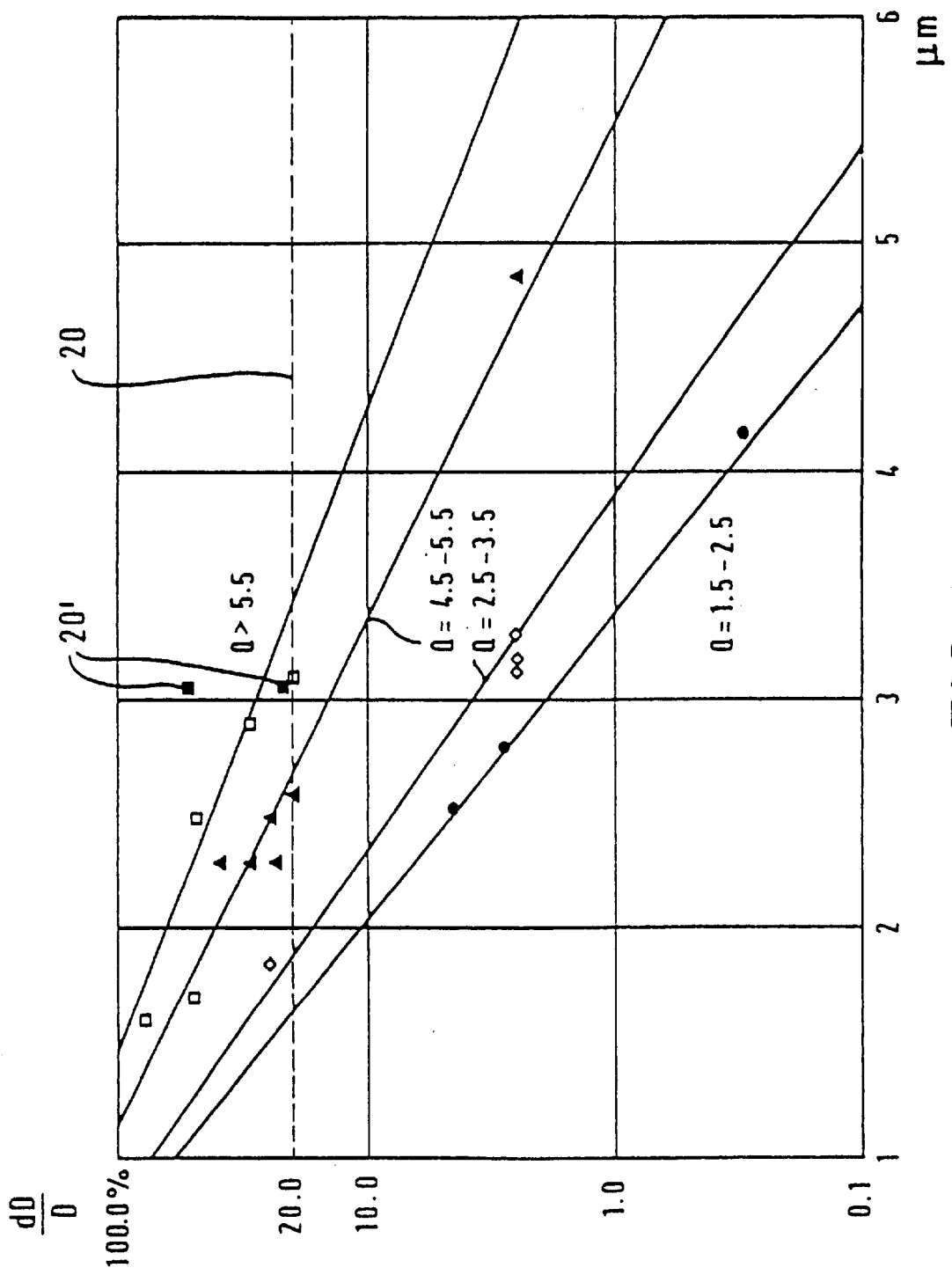
FIG. 4 shows the elongation at break (ductility) of zircaloy cladding tubes with different Q factors, as a function of the particle size of the zircaloy.

FIG. 4 shows how the maximum extension which can be achieved in cladding tubes without fracture under an iodine-containing atmosphere (approx. 0.03 mg/cm³) at from 300 to 400° C. is dependent on the grain size KD (iodine stress-cracking test). An elongation at break of 20% is also found in pure zirconium, which is used as a liner and can therefore be regarded as providing sufficient protection against PCI and stress-corrosion cracking which starts from the inner surface and is caused by the iodine-containing medium in the internal volume of the fuel rod. The measured points which lie above the line 20 therefore describe a material which is sufficiently resistant to PCI. These measured points were taken for materials which have been deformed with different Q values. 20' indicates the materials at the surfaces of the cladding tube according to this exemplary embodiment. The line approximately coincides with the boundary condition γ≦3.5. Materials which fulfill the condition γ≦3.5 can thus be regarded as being resistant to PCI.

Figure 5:
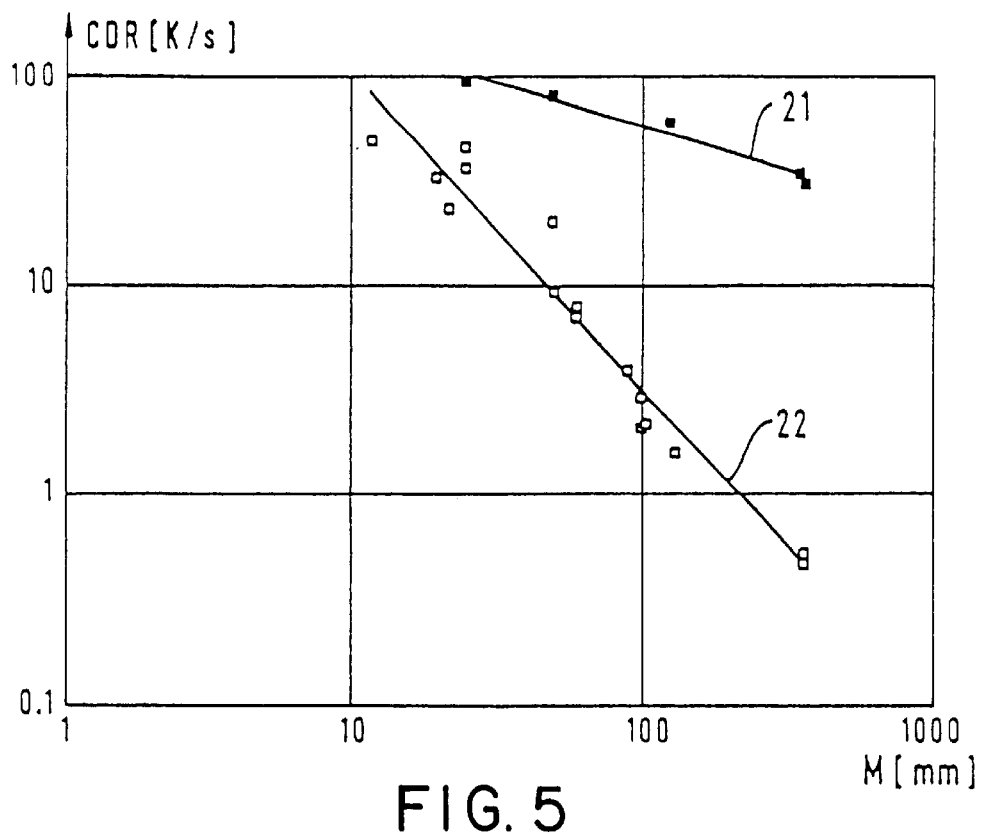
FIGS. 5, 6 show the cooling-down rate ("CDR") below the surface and in the center of a zircaloy body during quenching in water, as a function of the thickness of the body.

FIG. 5 plots the cooling-down rate (CDR) which is established at the surface (curve 21) and in the center (curve 22) of an elongate, cylindrical starting body when the latter is quenched in water and, in the process, passes through the temperature range between 700∅ and 850° C. The cooling-down rate was measured for various diameters M of the material. From these curves, it is possible to determine the following dependency of the cooling-down rate (CDR) on the material thickness M:

$$CDR = 3612 \cdot M^{-1.529} \text{ (in the center)}$$

$$CDR = 4.04 \cdot M^{-0.425} \text{ (on the outer surface)}$$

For a starting body of M=335 mm, this results, in accordance with the experiment, in $$CDR = 0.50 \text{ K/s or } CDR = 34.2 \text{ K/s}$$

for the center or about 5 mm below the surface of the starting body, respectively. For M=455 mm, the corresponding values are $$CDR = 0.31 \text{ K/s and } CDR = 30.1 \text{ K/s, respectively.}$$

Both bodies therefore fulfill the condition CDR<0.5 K/s (in the center) and CDR>30 K/s (at the surface). By contrast, thinner or thicker billets (M>455 mm or M<335) are unable to satisfy these conditions simultaneously.

Figure 6:
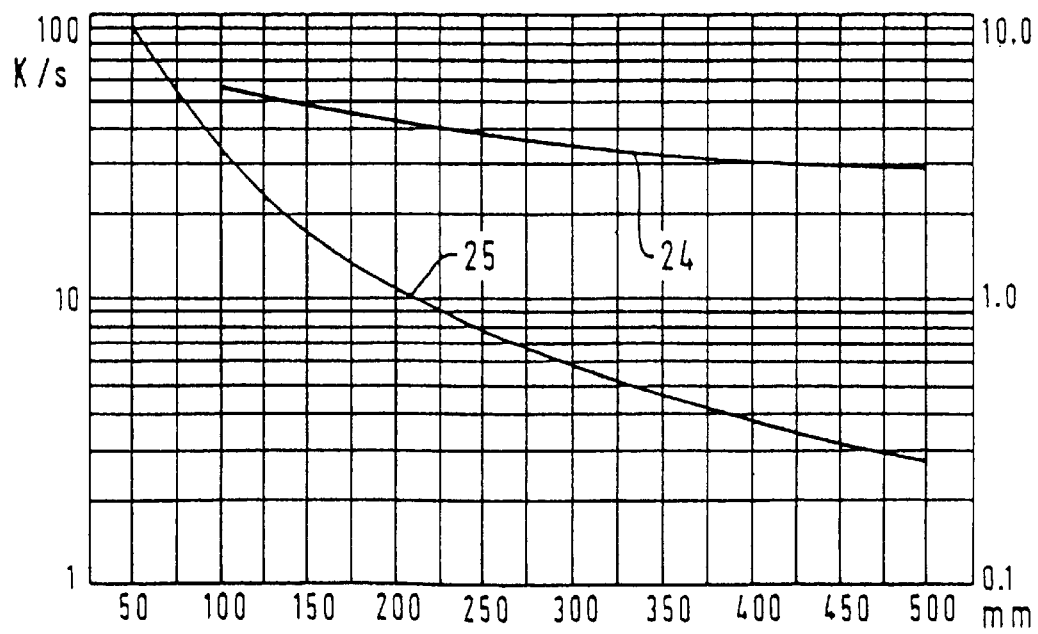

FIG. 6 shows the cooling-down rate (CDR) in the vicinity of the surface (curve 24) and, in the center (curve 25) of the starting body of this exemplary embodiment, in a linear/logarithmic representation.

These dimensions of the starting body are fixed in such a way that the PGP and the mean diameter φ of the secondary phases during the cooling-down process adopt the prescribed values both at the surface and in the center simultaneously.

Figure 7:
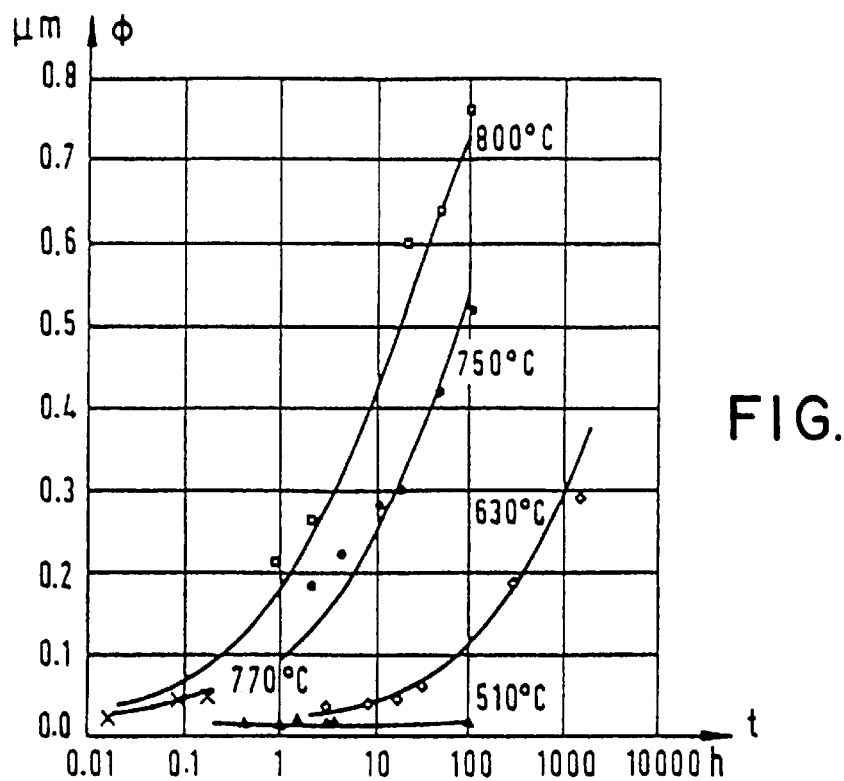
FIGS. 7, 8 show the growth (mean particle diameter $\phi$ of the secondary phases with homogenous annealing and quenching in the center and at the surface of the body.

To determine the diameter M of a suitable starting body, the following relationship between the mean particle diameter φ (measured in μm) and the annealing time t (measured in hours) can be used, having been found by measurements carried out on zircaloy at annealing temperatures of T=510° C., 630° C., 750° C. and 800° C. (FIG. 7):

$$\phi = \phi_{min} + \frac{\phi_{max} - \phi_{min}}{1 + \frac{1}{k \cdot t^n \exp(Q/RT)}} \, \mu m$$

or, with PGP=PGP=$10^{14} \cdot \Sigma\{t \cdot \exp(-Q/nRT)\}$:

$$\phi = \frac{\phi_{min} + 10^6 \cdot k \cdot PGP^n}{(\phi_{max} - \phi_{min}) + 10^6 \cdot k \cdot PGP^n} \, \mu m$$

where $\phi_{min}$ is the starting value at the beginning of the heat-treatment process (for quenched zircaloy: about 0.02 μm) and $\phi_{max}$ is the maximum value which is produced by the insoluble fraction of the alloying elements (in the case of zircaloy: 1.0 μm).

Figure 8:
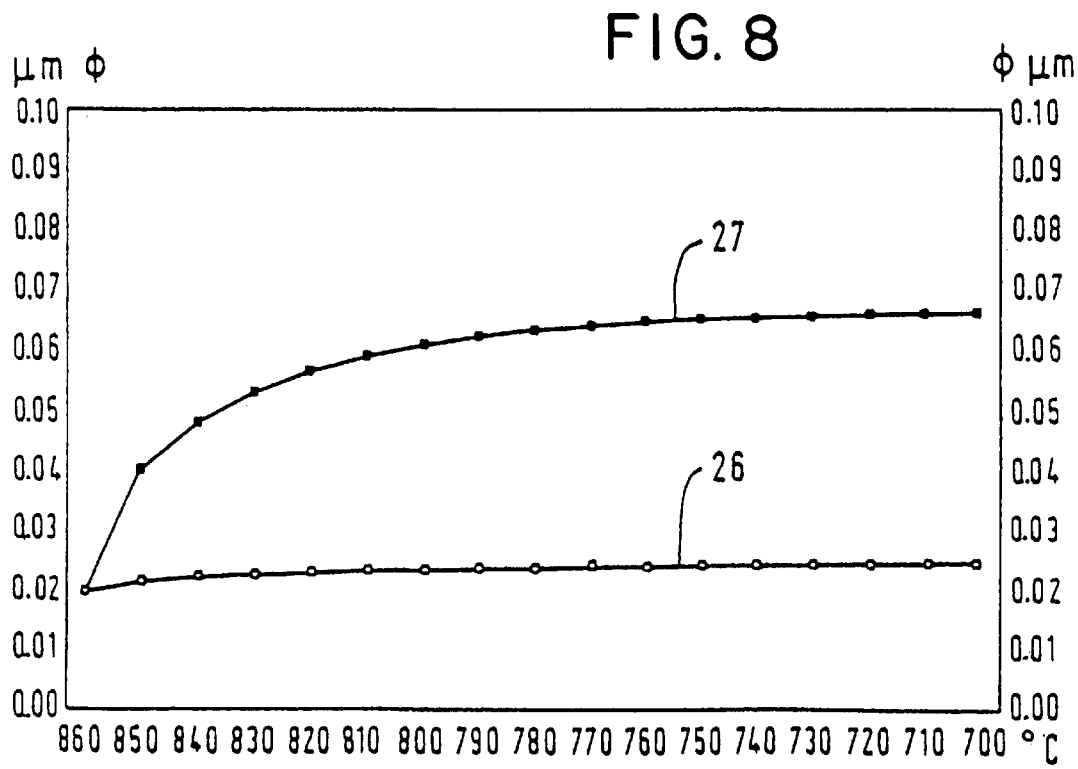

The β-quenching of the starting body causes an increase in the PGP, which can be described by breaking down the temperature range between the dissolution temperature (i.e. the start of precipitation of secondary phases, approximately 860° C.) and 700° C. (temperatures lower than this make practically no further contribution) into individual steps and using the end value of the preceding individual step as the starting value for a following individual step. Tables 1 and 2 and FIG. 8 show the results for the material in the center (curve 27) and below the surface (curve 26) of the starting body.

Figure 9:
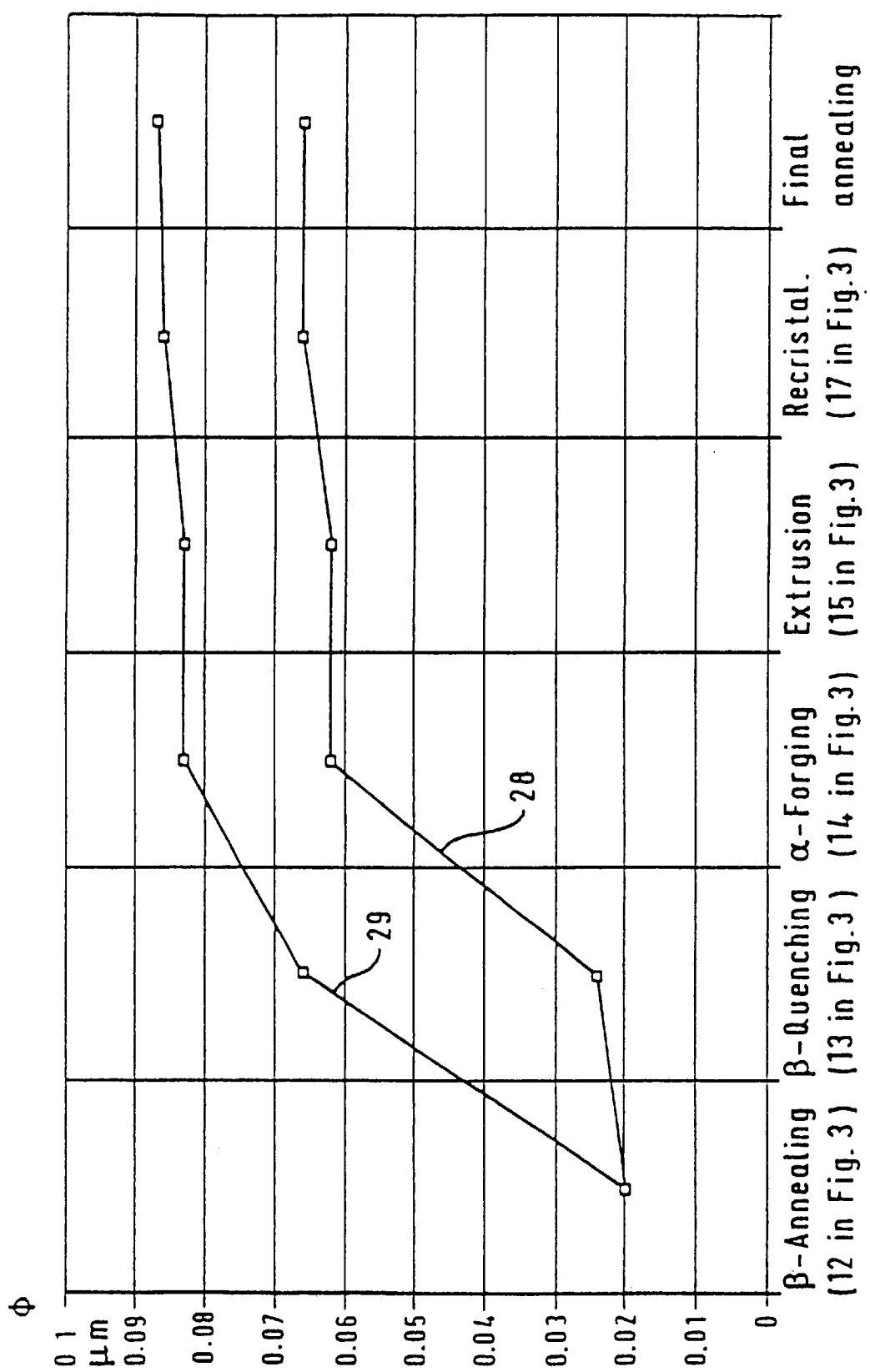
FIG. 9 shows the growth of the particles at the inner surface and outer surface of the cladding tube as a function of their fabrication history.

The tables also show the development of φ and PGP for the further steps (positions 14 to 19 in FIG. 3), no further growth taking place during pilgering and cold working. FIG. 9 shows the growth of the particles in the material which forms the outer surface and inner surface of the finished cladding tube, i.e. from the peripheral area and center, respectively, of the quenched starting body.

After β-quenching, the following values are found at the inner wall: PGP=1.013 and φ=0.066 μm (Table 1). According to Table 2, the following values apply at the outer surface of the starting body: PGP=0.014, and the logarithmic mean particle diameter is 0.024 μm.

Hot forging or the temperatures in the α-range result in a change by PGP=0.83, which satisfies the requirement

PGP<1.0.

In the following finishing work carried out on the cladding tube, in practice only the intermediate annealing and the final annealing (temperatures generally between about 5600 and 630ø) contribute to growth in particle size and to the grain size, resulting, on both the inner wall and the outer wall, in a PGP=0.18, which complies with the condition

PGP<0.2 and ultimately in a logarithmic mean of the particle diameter of 0.087 μm (at the inner wall) and 0.066 (at the outer wall).

The quenching of the specially dimensioned starting body therefore produces, for the precipitated alloying constituents, a desired, extremely differing distribution of coarse and fine particles at the inner and outer surfaces of the cladding tube in those areas of the starting body from which these surfaces are subsequently forried. This is illustrated by curves 28 and 29 from FIG. 9.

As has already been mentioned in the introduction, the invention provides for a certain minimum covering of sufficiently large particles on the inner wall (limit value $\phi_g$ for the individual particle size φ, i.e. a maximum value is to be observed for the distance between the large particles (the so-called "spacing" for $\phi \geq \phi_g$) on the inner wall. The spacing can often be measured, but is also given by calculation using the relationship $$\text{Spacing} = \frac{1000}{\sqrt[3]{N \cdot P}}$$

if the total number N of precipitated particles is known, as well as the probability $P(\phi_g)$ that one of the particles has a diameter φ which is above the predetermined limit value $\phi_g$. The following relationship applies to the total number of precipitated particles N $$N = \frac{6 \frac{V}{100}}{\pi \cdot \left(\frac{D}{1000}\right)^3 \exp\left\{3 \cdot \frac{\ln(\varepsilon^2)}{2}\right\}} \, mm^{-3}$$

where V is the total precipitated volume of alloying constituents (volume of all the precipitated particles), which for zirconium containing 0.16% Fe, 0.11% Cr and 0.06% Ni (i.e. zircaloy-2) is about 0.5%. An increase or reduction in the alloying elements changes the precipitated volume V approximately proportionally, with Ni being rated at a factor of 3. In this equation, alloying constituents which are soluble in the matrix, such as for example the metals tin and niobium, and non-metallic elements, such as for example oxygen (likewise soluble), are not to be taken into account. In the exemplary embodiment, measurements carried out on zircaloy alloys were taken into account and on average gave the same scatter ε=1.93 for all distributions of the precipitated particles. The basic assumption was a logarithmic standard distribution, i.e. the diameters φ of the individual particles exhibit a distribution which for log φ' forms a Gaussian distribution with a mean φ' and determines the mean particle size φ=exp φ', and which has a width which results from the standard deviation ε'=log φ−log φ'. Therefore, φ=φ·ε² applies for about 95% of the φ values.

In accordance with this total number N and the mean φ of the precipitated particles, as well as the scatter ε, the result is therefore a distribution from which the said probability P($\phi_g$) can be calculated.

For the inner surface, the invention prescribes, for particles whose size φ reaches at least the limit value $\phi_{g\,inner}$=1 μm, a maximum spacing of 20 μm, corresponding to a minimum number of $2.5 \cdot 10^3$ particles per mm² or a minimum number of $1.25 \cdot 10^5$ particles where $\phi \geq \phi_{g\,inner}$ per mm³ of the volume lying at the inner surface. By contrast, at the outer surface, for particles in which the relationship $\phi \geq \phi_{g\,outer}$, where $\phi_{g\,outer}$=2 μm, applies to the individual diameter φ, a maximum spacing of 100 μm is prescribed, corresponding to a maximum number of $10^2$ particles per mm² of the outer surface or a maximum number of $10^3$ particles per mm³ of the volume which is distributed at the outer surface.

Figure 10:
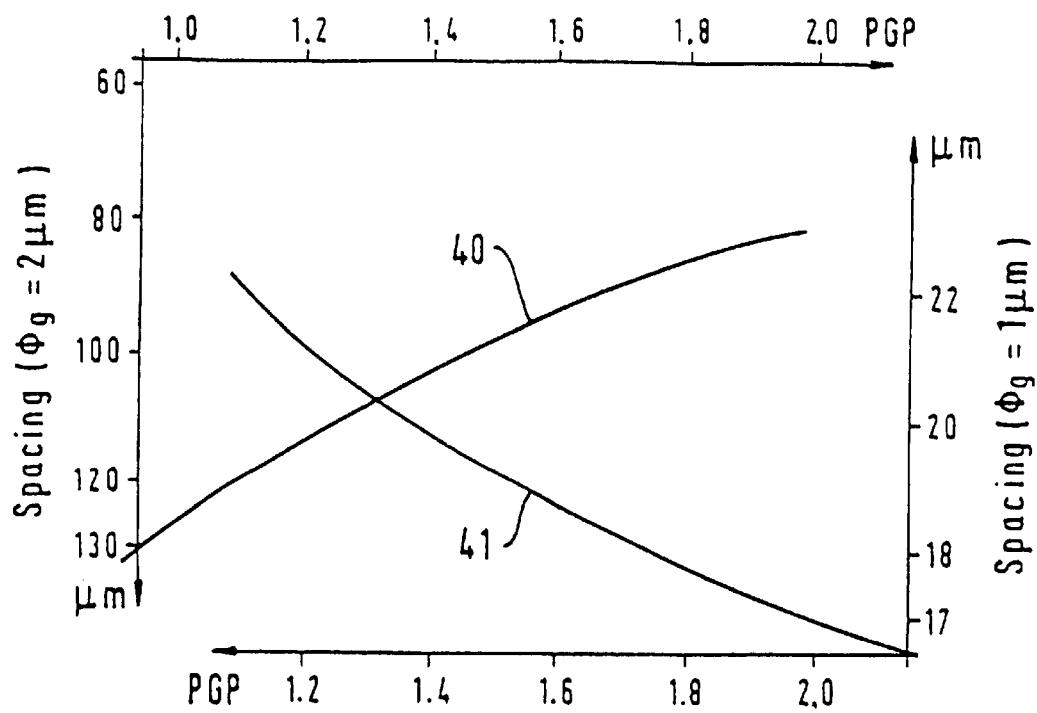
FIGS. 10, 11 show the spacing for particles of larger than 1 $\mu$m (inner surface) and larger than 2 $\mu$m (outer surface) as a function of the particle growth parameter or the mean particle size.

However, in most cases this means that at the inner surface the mean size of all the particles is higher and their density lower than at the outer surface, as can be seen from FIG. 10.

According to curve 40, to which the right-hand scale belongs, the spacing for particles $\phi \geq 1$ μm (i.e. the limit value $\phi_g$ inner prescribed at the inner wall) decreases with increasing PGP'. Curve 41 shows the corresponding relationships for $\phi \geq 2$ μm (i.e. the limit value $\phi_{g\ outer}$ prescribed at the outer wall). It is assumed here that the particles are spherical. The particles of the individual diameter $\phi \geq 1$ μm are to have an average spacing d≧20 μm at the inner wall, while particles where $\phi \geq 2$ μm at the outer wall are to have an average spacing d≧100 μm. This can be reliably achieved if, for example, PGP<1.22 is set at the outer wall, but PGP>1.7 is set at the inner wall.

Figure 11:
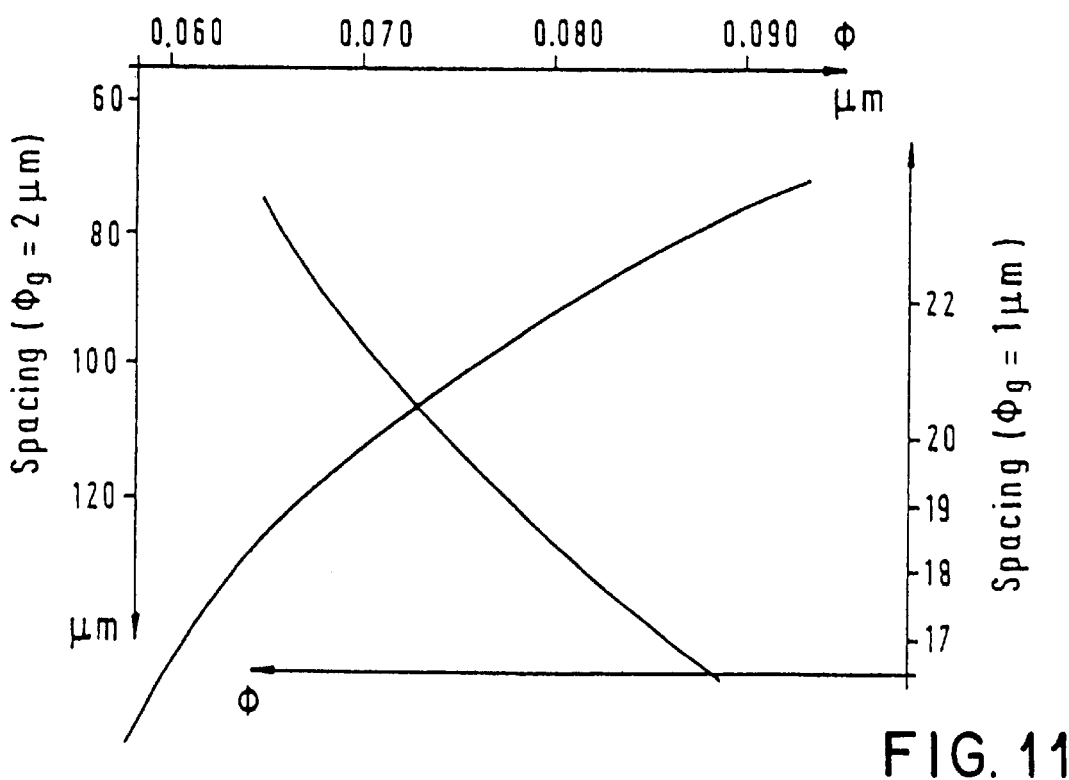

FIG. 11 shows how these values are converted to the dependency on the mean particle size φ. Use is made of the fact that the total number N of all the precipitated particles is inversely proportional to the 3rd power of the mean spacing, and the mean particle size can be calculated from the PGP.

The limit value $\phi_g$=2 μm and the associated spacing are used to characterize a distribution which has a sufficiently small amount of particles which are too large and could lead to nodular corrosion at the outer wall. The same distribution, which is characterized by φhd g=2 μm and a spacing of 100 μm, has a spacing of about 75 μm for particles with a minimum size $\phi_g$=1.8 μm. With this distribution, the logarithmic mean of the particle size is 0.075 μm. The above-mentioned PGP<1.22 describes a logarithmic distribution about a mean<0.07 μm, which is associated with a spacing of>112 μm for φhd g=2 μm and a spacing>85 for $\phi_g$=1.8 μm. Accordingly, for PGP=1.7, the mean particle size is about 0.08 μm and the spacing is about 18 μm for $\phi_g$=1 μm, about 91 μm for $\phi_g$=2 μm and about 70 μm for $\phi_g$=1.8 μm. According to FIG. 9, φ>0.08 μm can be maintained at the inner wall and φ<0.07 μm can be maintained at the outer wall.

The calculation can also be carried out in the opposite direction:

A spacing which is advantageous with regard to the resistance to nodular corrosion (the form of corrosion of zircaloy which is encountered under the chemical/thermal conditions of the boiling water reactor) and is at most 100 μm is set for the particles at the outer surface of size φ>2 μm. The volumetric content of precipitated alloying constituents is determined for the alloying composition envisaged. Using these two variables, it is possible (assuming that the logarithm of the individual particle sizes φ corresponds to a Gaussian distribution with the measurable standard deviations which are typical of the alloy) to determine the mean particle size or the corresponding PGP which, due to the history, the material has to reach at the outer surface. This ensures that there are practically no excessively large particles which could initiate corrosion at the outer surface.

By contrast, the inner surface is to be protected from uniform corrosion, which represents a risk on the inner side in the event of water penetrating into a defective cladding tube, and is therefore to contain an adequate number of sufficiently large particles (φ>1 μm).

Figure 12:
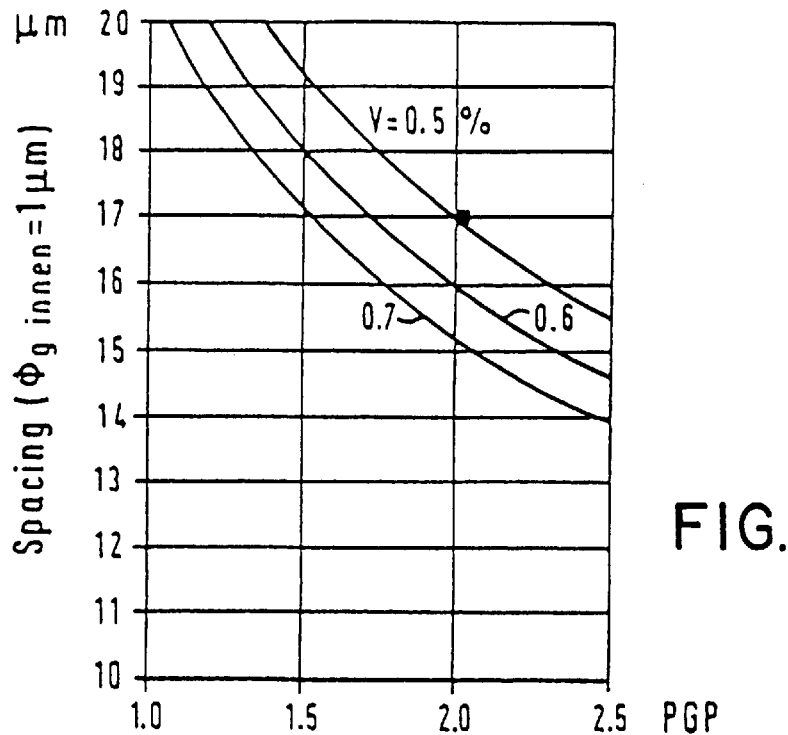
FIGS. 12, 13 show the spacing as a function of the level of precipitatable alloying constituents for particles of larger than 1 $\mu$m and 2 $\mu$m, respectively ($\phi_g$=1 $\mu$m and 2 $\mu$m, respectively)
Figure 13:
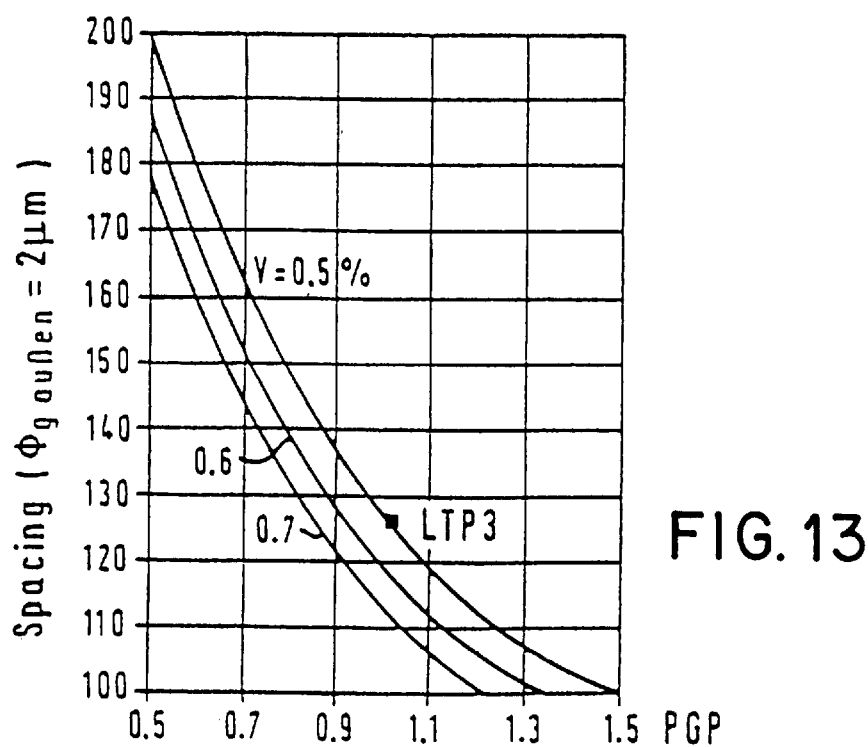

In this connection, the same calculation can be carried out, selecting a spacing which is at least 100 μm and leads to a correspondingly low PGP. The calculation may in this case be replaced by characteristic curves such as those which are shown in FIG. 12 for $\phi_g$=1 μm and in FIG. 13 for $\phi_g$=2 μm (i.e. the inner and outer walls).

Since, moreover, a ductility which is similar to that of the tried-and-tested zirconium liner is desired, a thermal/mechanical preliminary treatment is fixed in order to set the mean grain diameter KD and the amount of deformation, i.e. the Kearns factor (fr).

Then, the PGP value which corresponds to the growth of the particles during the fixed thermal/mechanical preliminary treatment is subtracted from the PGP values of the two surfaces. The remaining PGP values for the material of the outer surface and the inner surface then determine the sequence which has to be selected for the β-quenching in the center and at the periphery of the starting body. These cooling-down rates during the β-quenching determine the dimensions of the starting body which is to be subjected to the β-quenching. Characteristic curves can also be calculated and/or measured for this determination of the cooling-down rate and dimensions, as can be seen from FIGS. 5 to 8.

Table 3 shows that elongate, cylindrical starting bodies with diameters M of between 335 mm and 445 mm are in fact suitable for the production of cladding tubes having the intended particle populations.

For the exemplary embodiment, the data concerning the thermal history are compiled in Table 4 for the material of the inner wall and of the outer wall, together with the resultant diameters. Table 5 shows data which have been measured or calculated on the finished cladding tube.

Figure 14:
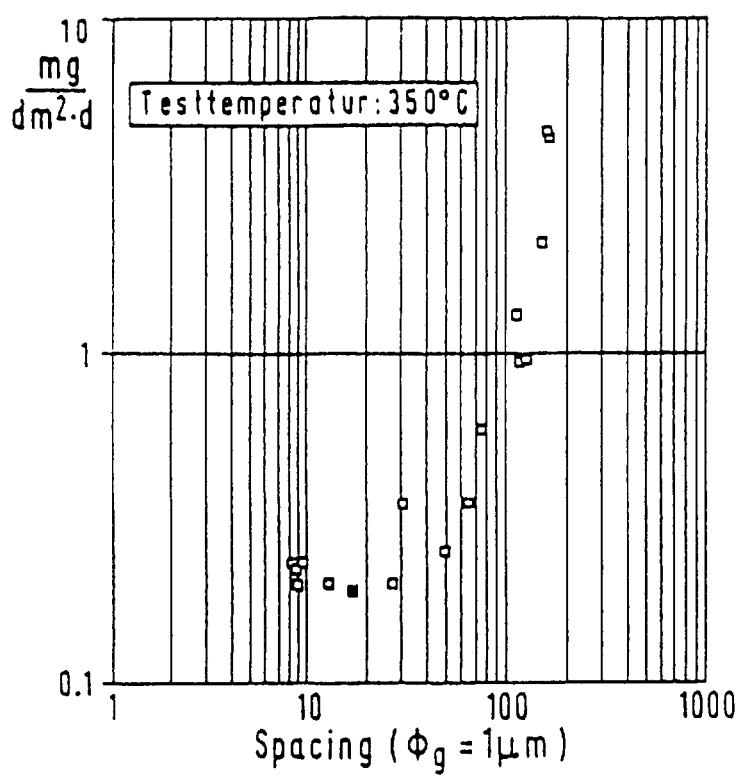
FIG. 14 shows the corrosion as a function of the spacing for $\phi_g$=1 $\mu$m.

FIG. 14 relates to the (essentially uniform) corrosion at the inner surface of a zircaloy tube if water has penetrated into the fuel rods. The corrosion rate, i.e. the daily growth in the corrosive layer (measured in mg/dm$^2$) at a test temperature of 350° C., is particularly low if the spacing for particles of a minimum size $\phi_g$=1 μm is about 20 μm or below.

Figure 15:
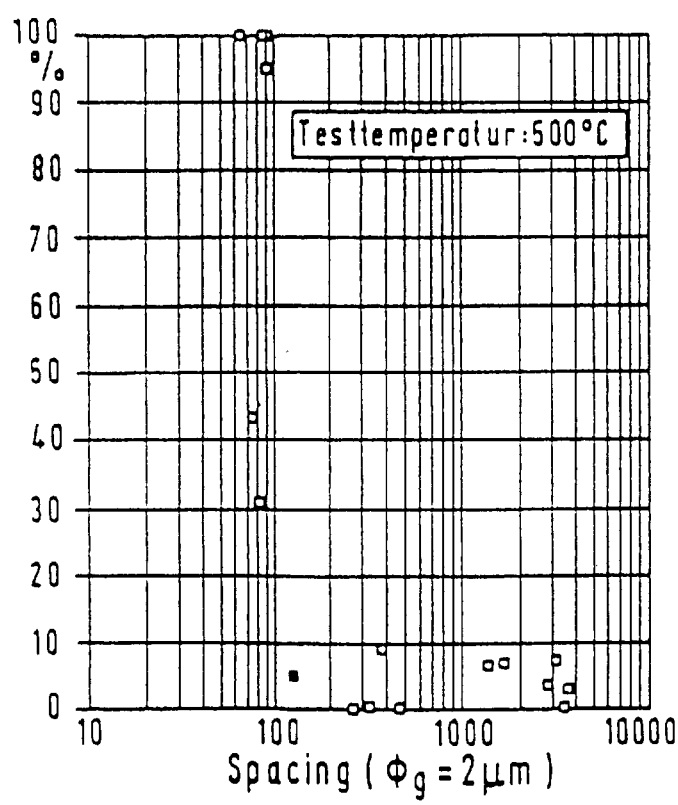
FIG. 15 shows the nodular corrosion as a function of the spacing for $\phi_g$=2 $\mu$m.

By contrast, FIG. 15 describes the corrosion under the conditions which are encountered at the outer surface of the fuel rod and, in boiling water reactors, lead to nodular corrosion. The percentage of the surface area which is covered by blisters represents a suitable parameter for measuring nodular corrosion. Even at a test temperature of 500° C., this percentage is low if the spacing for particles with a minimum size $\phi_g$=2 μm is over 100 μm, i.e. such particles are only very rare. In the meantime, correspondingly fitted fuel rods have been in use in the reactor and to date have presented the advantageous characteristics expected.

FIGS. 14 and 15 demonstrate that a greater spacing inhibits nodular corrosion but promotes uniform corrosion, and therefore in practice it is impossible to simultaneously achieve satisfactory resistance to both types of corrosion. Thus, according to FIG. 14, nodular corrosion is low with a spacing of 15 μm, which as shown by FIG. 10 belongs to a logarithmic mean of the particle size of about 0.1 μm; however, as shown in FIG. 10, at this particle size, the spacing at the inner surface adopts a value which, as shown by FIG. 15, leads to a high level of uniform corrosion. The invention therefore provides for a particle size at the outer surface which, when subjected to logarithmic averaging, results in a maximum mean of 0.1 μm, while the particles at the inner surface are at any rate larger on average than at the outer surface. Furthermore, irrespective of the distribution of the particles, the ductility of the wall material ensures that stresses which are initiated by corrosive growth nuclei do not lead to cracks which could propagate in the wall even under an iodine-containing atmosphere.

TABLE 2

| FIG. 3 | Temp °C. | t (sec.) | t (h) | PGP | Σ PGP | φ |
|---|---|---|---|---|---|---|
| Pos. 13 (β-Quch.) | 850 | 0.29 | | | 0.003 | 0.022 |
| | 840 | 0.29 | | | 0.006 | 0.023 |
| | 830 | 0.29 | | | 0.008 | 0.023 |
| | 820 | 0.29 | | | 0.010 | 0.023 |
| | 810 | 0.29 | | | 0.011 | 0.024 |
| | 800 | 0.29 | | | 0.012 | 0.024 |
| | 790 | 0.29 | | | 0.012 | 0.024 |
| | 780 | 0.29 | | | 0.013 | 0.024 |
| | 770 | 0.29 | | | 0.013 | 0.024 |
| | 760 | 0.29 | | | 0.014 | 0.024 |
| | 750 | 0.29 | | | 0.014 | 0.024 |
| | 740 | 0.29 | | | 0.014 | 0.024 |
| | 730 | 0.29 | | | 0.014 | 0.024 |
| | 720 | 0.29 | | | 0.014 | 0.024 |
| | 710 | 0.29 | | | 0.014 | 0.024 |
| | 700 | 0.29 | | | 0.014 | 0.024 |
| 14 (Forg.) | 670 | | 4.5 | 0.828 | 0.842 | 0.062 |
| 15 (Extr.) | 650 | 180 | | 0.004 | 0.847 | 0.062 |
| 17 (Recr.) | 630 | | 4 | 0.164 | 1.011 | 0.066 |
| 19 (Ann.) | 560 | | 6 | 0.013 | 1.023 | 0.066 |
| | | | | Final: | 1.023 | 0.066 |

TABLE 4

| Position in FIG. 3 | Temp. | Time at temperature Outer | Inner | PGP Outer | inner |
|---|---|---|---|---|---|
| 13 (Quentch) | 850–700 | 4.8 s 34.0 K/s | 308 s 0.49 K/s | 0.014 | 1.013 |
| 14 (Forg.) | 670 | 4.5 h | 4.5 h | 0.828 | 0.828 |
| 15 (Extr.) | 650 | 180 s | 180 s | 0.004 | 0.004 |
| 17 (Recr.) | 630 | 4 h | 4 h | 0.164 | 0.164 |
| 19 (Ann.) | 560 | 6 h | 6 h | 0.013 | 0.013 |
| Final: | | | | Σ = 1.023 ↓ φ$_{inner}$ = 0.066 μm | Σ = 2.022 ↓ φ$_{outer}$ = 0.087 μm |

TABLE 3

| | M = 335 mm | | M = 445 mm | |
|---|---|---|---|---|
| | Central | Peripheral | Central | Peripheral |
| β-Quenching | CDR = 3612 · M$^{-1.529}$ = 0.50 K/s | CDR = 405 · D$^{-0.425}$ = 34.2 K/s | CDR = 3612 · M$^{-1.529}$ = 0.31 K/s | CDR = 405 · D$^{-0.425}$ = 30.1 K/s |
| | $\Delta PGP = \frac{0.5}{CDR}$ | $\Delta PGP = \frac{0.5}{CDR}$ | $\Delta PGP = \frac{0.5}{CDR}$ | $\Delta PGP = \frac{0.5}{CDR}$ |
| | PGP = 1.00 | PGP = 0.015 | PGP = 1.61 | PGP = 0.017 |
| α-Forging | PGP = 0.6 . . . 1.0 | PGP = 0.6 . . . 1.0 | PGP = 0.6 . . . 1.0 | PGP = 0.6 . . . 1.0 |
| Recristall. + Final Ann. | PGP = 0.1 . . . 0.2 | PGP = 0.1 . . . 0.2 | PGP = 0.1 . . . 0.2 | PGP = 0.1 . . . 0.2 |
| | Σ PGP > 1.7 | Σ PGP < 1.22 | Σ PGP > 2.31 | Σ PGP < 1.22 |
| Spacing | <18.2 μm (φ$_g$ = 1 μm) | >112 μm (φ$_g$ = 2 μm) | <16 μm (φ$_g$ = 1 μm) | >112 μm (φ$_g$ = 2 μm) |

TABLE 5

| | | measured | calculated |
|---|---|---|---|
| Mean grain size μm | μm | 3.07 | 2.83 |
| Texture (Kearns factor fr) | (–) | 0.67 | 0.67 |
| Uniform corrosion (internal) | mg/dm$^2$d | 0.19 | |

TABLE 5-continued

| | | measured | calculated |
|---|---|---|---|
| Nodular corrosion (external) | % | 5 | |
| Extension in the iodine SCC test | % | 22...53 | 38 |
| Mean of the SPPs (inner) | nm | 88 | 87 |
| Mean of the SPPs (outer) | nm | 66 | 66 |
| Spacing (inner) | μm | | 17 |
| Spacing (outer) | μm | | 126 |
| Criterion γ | | | |
| From measured values | | γ = 3.24 | |
| From calculated values | | γ = 3.15 | |

We claim:

1. A process for producing a cladding tube for a fuel rod of a boiling water reactor, the method which comprises:

heating a starting body to a given temperature, the starting body being made from alloying constituents of a zircaloy, a fraction of the alloying constituents being dissolved at the given temperature, the fraction of the alloying constituents being insoluble at an operating temperature of a boiling water reactor;

subsequently cooling a first region of the starting body at a first cooling-down rate and cooling a second region of the starting body at a second cooling-down rate, the first cooling-down rate being slower than the second cooling-down rate;

subsequently extruding the starting body for forming a tube blank having an inner surface region and an outer surface region, the outer surface region originating from material of the second region of the starting body having a first logarithmic mean value of a particle size of a precipitated fraction of the alloying constituents, the inner surface region originating from material of the first region of the starting body having a second logarithmic mean value of a particle size of a precipitated fraction of the alloying constituents, the first logarithmic mean value being below 0.1 μm, the second logarithmic mean value being greater than the first logarithmic mean value;

producing a cladding tube from the tube blank by using a mechanical/thermal treatment;

exposing the inner surface region and the outer surface region to substantially identical temperatures during the mechanical/thermal treatment and applying, after the extruding step, only temperatures of below 810° C.;

providing, with the mechanical/thermal treatment, the cladding tube with a given ductility, the given ductility resulting in a ductile yield of at least 20% at a temperature of 300° C.

2. The process according to claim 1, which comprises setting the second logarithmic mean value to be at least 0.01 µm greater than the first logarithmic mean value.

3. The process according to claim 1, which comprises setting the first logarithmic mean value to be greater than 0.055 µm.

4. The process according to claim 1, which comprises forging the starting body in an α-range, subsequent to the cooling step and prior to the extruding step.

5. A cladding tube for a fuel rod for a boiling water reactor, comprising:

a cladding tube body made from a starting body by heating the starting body to a given temperature, the starting body being made from alloying constituents of a zircaloy, a fraction of the alloying constituents being dissolved at the given temperature, the fraction of the alloying constituents being insoluble at an operating temperature of a boiling water reactor, by subsequently cooling a first region of the starting body at a first cooling-down rate and cooling a second region of the starting body at a second cooling-down rate, the first cooling-down rate being slower than the second cooling-down rate, by extruding the starting body to form a tube blank having an inner surface region and an outer surface region, said inner surface region originating from material of the first region of the starting body, said outer surface region originating from material of the second region of the starting body, by heat treating the tube blank using a mechanical/thermal treatment, by exposing the inner surface region and the outer surface region to substantially identical temperatures during the mechanical/thermal treatment and by applying, after the extruding, only temperatures of below 810° C.;

said cladding tube body having a given ductility with a ductile yield of at least 20% at a temperature of 300° C.; and said cladding tube body having a precipitated fraction of the alloying constituents with first particle sizes at said outer surface region and second particle sizes at said inner surface region, said first particle sizes having a first logarithmic mean value of less than 0.1 µm, said second particle sizes having a second logarithmic mean value being greater than the first logarithmic mean value.

6. The cladding tube according to claim 5, wherein said zircaloy contains from 0.8 to 2.0% by weight of tin, from 0.05 to 0.4% by weight of iron, up to 0.20% by weight of chromium and up to 0.15% by weight of nickel.

7. A cladding tube for a fuel rod for a boiling water reactor, comprising:

a cladding tube body including a zirconium alloy;

said cladding tube body having an inner surface region and outer surface region, said zirconium alloy extending from said inner surface region to said outer surface region;

said inner and outer surface regions being formed from a material originating from given regions of a starting body having alloying constituents of zircaloy, the given regions having been subjected to different heat treatments, a fraction of the alloying constituents being insoluble at operating temperatures of a boiling water reactor and having a given particle size distribution, a logarithmic mean value for a particle size being greater at said inner surface region than at said outer surface region; and said cladding tube body having a ductility corresponding to a relative elongation at break of at least 20% at a temperature of 300° C., the ductility being set by mechanical deformation of a tube blank formed from the starting body at temperatures below 810° C. and substantially identical at said inner and outer surfaces.

8. The cladding tube according to claim 7, wherein the logarithmic mean value for the particle size at said outer surface region is less than 0.1 µm.

9. The cladding tube according to claim 7, wherein the logarithmic mean value for the particle size at said outer surface region is more than 0.055 µm.

10. The cladding tube according to claim 7, wherein the logarithmic mean value for the particle size at said inner surface region is at least 0.01 µm greater than the logarithmic mean value for the particle size at said outer inner surface region.

11. The cladding tube according to claim 7, wherein said zirconium alloy contains from 0.8 to 2.0% by weight of tin, from 0.05 to 0.4% by weight of iron, up to 0.20% by weight of chromium and up to 0.15% by weight of nickel.

12. A cladding tube for a fuel rod for a boiling water reactor fuel element, comprising:

a cladding tube body including a zirconium alloy;

said cladding tube body having an inner surface region and an outer surface region;

said zirconium alloy having a substantially constant chemical composition between said inner surface region and said outer surface region and having different microstructures at said inner surface region and said outer surface region;

said zirconium alloy having a grain structure and texture, at said inner surface region, with a quotient $\gamma = \sqrt[3]{(KD)}/(fr)^2$ of up to 3.5, KD being a mean value of a logarithmic diameter distribution of a grain size measured in µm and fr being a Kearns parameter;

said cladding tube body including precipitated alloying constituents provided in accordance with a first three-dimensional distribution at said inner surface region and provided in accordance with a second three-dimensional distribution at said outer surface region;

said precipitated alloying constituents provided in accordance with the first three-dimensional distribution having precipitated particles of a given size, such that if the given size exceeds a limit value of 1 µm, an average distance between the precipitated particles does not exceed 20 µm; and said precipitated alloying constituents provided in accordance with the second three-dimensional distribution having precipitated particles of a given size such that if the given size exceeds 2 µm, the average distance between the precipitated particles is not less than 100 µm.

13. The cladding tube according to claim 12, wherein said zirconium alloy contains from 1.0 to 2.0% Sn, from 0.10 to 0.35% by weight Fe, from 0.10 to 0.20% by weight Cr, a maximum of 0.10% by weight Ni, and from 50 to 200 ppm silicon.

14. The cladding tube according to claim 12, wherein said cladding tube body further includes zirconium including from 0.05 to 0.20% oxygen.

15. The cladding tube according to claim 14, wherein said cladding tube body further includes 0.05 to 0.20% oxygen and up to 0.20% of other elements.

16. The cladding tube according to claim 12, wherein said precipitated particles are composed of substantially zirconium and at least one of said alloying constituents selected from the group consisting of iron, chromium, silicon and nickel.

17. A process for producing a cladding tube for a fuel element for a boiling water reactor, the method which comprises:

providing a starting body made from a zirconium alloy;

solution-annealing the starting body at a temperature in a β-range;

quenching the starting body with a first cooling-down rate in a center of the starting body and with a second cooling-down rate at a depth of 5 mm below an outer surface of the starting body, the first cooling-down rate, while passing through an α+β-range in the center of the starting body, does not exceed 0.5 K/s, and the second cooling-down rate at a depth of 5 mm below the outer surface is at least 30 K/s;

subsequently annealing and forging the starting body in an α-range and maintaining a value for a particle growth parameter of between 0.6 and 1 for a treatment subsequent to the quenching step; and subsequently further processing the starting body for producing a finished cladding tube, the step of further processing having a total thermal history resulting in a value of between 0.1 and 0.2 for the particle growth parameter.

18. The process according to claim 17, which comprises quenching the starting body in a water bath.

19. The process according to claim 17, which comprises providing the starting body with a content of from 1.0 to 2% Sn, from 0.10 to 0.35% by weight Fe, from 0.10 to 0.20% by weight Cr, at most 0.15% by weight Ni, from 50 to 200 ppm of Si, with a remainder of zirconium of standard purity with from 0.05 to 0.20% by weight O.

* * * * *